Patented Jan. 6, 1948

2,434,100

UNITED STATES PATENT OFFICE 2,434,100

2-CARBOXY-HALOGENO-1,4-THIA-CHROMANONE

Euclid Wilfred Bousquet, Wilmington, Del., assignor to E. I. du Pont de Nemours & Company, Wilmington, Del., a corporation of Delaware No Drawing. Application June 27, 1945, Serial No. 601,919

4 Claims. (Cl. 260—327)

This invention relates to new compositions of matter and more particularly to halogenophenylthiosuccinic acids and their derivatives.

It is an object of this invention to provide new and useful compositions of matter. A further object is to provide halogenophenylthiosuccinic acid. A still further object resides in processes for the preparation of these new and useful compositions of the matter. Other objects will appear hereinafter.

These objects are accomplished by the invention of organic compounds containing a halogenophenylthio radical attached to a secondary carbon atom bearing one hydrogen atom, one of the remaining valences of said secondary carbon atom being satisfied by a non-oxo-carbonylic radical and the other valence of said secondary carbon atom being satisfied by a methylene group, which is, in turn, attached to a carbonyl group, the remaining valence of said carbonyl group being satisfied by a polyvalent non-metallic element of atomic weight of 12 to 16, i. e., of atomic number 6 to 8. Compounds of this class include halogenophenylthiosuccinic acids, their salts, esters, amides and the corresponding 1,4-thiachromanones.

The halogenophenylthiosuccinic acids are obtained by reacting a halogenophenyl mercaptan, e. g., p-chlorobenzenethiol in an aqueous solution of an alkali metal hydroxide with the alkali metal salt of maleic acid at a temperature within the range of 15–150° C., preferably at the reflux temperature of the solution. Upon acidification with mineral acid, the halogenophenylthiosuccinic acid separates as a crystalline solid. The 1,4-thiachromanones can be obtained by heating the halogenophenylthiosuccinic acid with concentrated sulfuric acid.

The following specific examples in which quantities are given by weight serve to illustrate the specific examples of this invention.

Example I

Twenty-nine parts of p-chlorobenzene thiol and 19.6 parts of maleic anhydride were dissolved in an aqueous solution containing 16 parts of sodium hydroxide and two parts of piperidine dissolved in 200 parts of water and 80 parts of ethyl alcohol. The mixture was heated under reflux for two hours and then evaporated to about one-half its original volume, and then acidified with concentrated hydrochloric acid. Extraction of the acidified mixture with ether gave 47 parts of crude p-chlorophenylthiosuccinic acid which, upon recrystallization from water, had a melting point of 163–164° C. Titration of this product showed a neutral equivalent of 259.2 as compound to the calculated value of 260.5. Analysis: Calculated for $C_{10}H_9ClO_4S$: C, 46.06%; H, 3.45%; Cl, 13.64%; S, 12.28%. Found: C, 46.30%, 46.68%; H, 3.43, 3.45%; Cl, 13.51, 13.46%; S, 12.35, 12.29%.

Example II

A mixture of 18 parts of p-chlorophenylthiosuccinic acid, one part of p-toluenesulfonic acid, 40 parts of n-butyl alcohol and 88 parts of benzene was heated under reflux in an apparatus provided with means for the continuous removal and separation of the water-benzene binary and return of the benzene to the reaction vessel. After 2.5 parts of water had been removed, benzene and excess butyl alcohol were distilled from the reaction mixture. The residue was then washed with 5% sodium carbonate solution to remove excess acids and finally distilled to obtain 22 parts of di-n-butyl p-chlorophenylthiosuccinate boiling at 209–211° C./3 mm. Analysis: Calculated for $C_{18}H_{25}ClO_4S$: Cl, 9.39%; S, 8.59%. Found: Cl, 9.69; S, 8.17%.

Example III

A mixture of 38 parts of p-chlorophenylthiosuccinic acid and 186 parts of concentrated sulfuric acid was heated rapidly to 100° C. and held at this temperature for one-quarter hour. The reaction mixture was then poured over 100 parts of ice, after which the aqueous mixture was extracted with ether and the ether extract washed thoroughly with water to remove excess sulfuric acid. There was thus obtained 20 parts of 2-carboxy-6-chloro-1,4-thiachromanone melting at 178–180° C. This crude product was further purified by dissolving in 5% sodium carbonate solution, filtering from insoluble matter and reprecipitating with concentrated hydrochloric acid. In this manner a white crystalline product, M. P., 184–186° C., was obtained. The acid had a neutral equivalent of 239.2 as compared to a calculated value of 242.5. Analysis: Calculated for $C_{10}H_7ClO_3S$: C, 49.48%; H, 2.88%; Cl, 14.63%. Found: C, 49.19, 49.21%; H, 3.06, 2.83%; Cl, 14.55, 14.74%.

Example IV

A mixture of 19 parts of 2-carboxy-6-chloro-1,4-thiachromanone, prepared as described in Example III, 60 parts of absolute ethyl alcohol and 0.5 part of p-toluene-sulfonic acid was heated under reflux for 15 hours. The excess alcohol was then removed by distillation and the residue washed with a 5% aqueous solution of sodium carbonate to remove acidic materials. Upon distillation, 15 parts of 2-carboethoxy-6-chloro-1,4-thiachromanone boiling at 191–193° C./3 mm. was obtained. Upon standing the ester solidified to a light yellow crystalline solid having a melting point of 65–66° C. Analysis: Calculated for $C_{12}H_{11}ClO_3S$: C, 53.23%; H, 4.06%; Cl, 13.12%; S, 11.82%. Found: C, 53.47, 53.85%; H, 4.04, 4.08%; Cl, 12.43, 12.74%; S, 11.94, 11.90%.

Although the invention is illustrated with p-chlorophenylthiosuccinic acid and certain of its derivatives, it is applicable to halogenophenylthiosuccinic acids in general. Examples of substituted succinic acids of this type include o-chlorophenylthiosuccinic acid, p-chlorophenylthiosuccinic acid, o-bromophenylthiosuccinic acid and p-bromophenylthiosuccinic acid. These may be prepared by the process of Example I, the p-chlorobenzenethiol of that example being replaced by the corresponding halogenophenyl mercaptan.

The esters of the halogenophenylthiosuccinic acids can be prepared by reaction of the acids as illustrated in Example II or the acid halide with any organic compound containing an esterifiable hydroxyl group. Examples of such compounds in addition to n-butyl alcohol mentioned in Example II include saturated aliphatic alcohols, e. g., methyl, ethyl, propyl, octyl, lauryl and stearyl alcohols; unsaturated aliphatic alcohols, e. g., allyl and oleyl alcohols; alicyclic alcohols, e. g., cyclohexyl and methylcyclohexyl alcohols; aromatic hydroxy compounds, e. g., phenol, the cresols, benzyl alcohol and phenylethyl alcohol; etc.

The salts may be prepared from the acid by reacting the same with an aqueous solution of the metal or ammonium hydroxide or carbonate or by double decomposition of an alkali metal salt of the acid with an aqueous solution of an appropriate metal salt.

The amides may be obtained by reacting an ester with a concentrated aqueous solution of ammonia or, preferably, from the acid chloride with ammonia or a primary or secondary amine, preferably a monoamine, e. g., methylamine, butylamine and dibutylamine.

The products of this invention are useful for various purposes. They may be used as intermediates for the preparation of other derivatives such as those illustrated in the examples, as pharmaceuticals, pest control agents, e. g., bactericides, fungicides, insecticides, moth-proofing agents, as plant growth regulants, as epithelial stimulants, and as resin intermediates.

The invention is not limited to the exact details shown and described for obvious modifications will occur to a person skilled in the art.

What is claimed is:
1. 2-carboxy-6-chloro-1,4-thiachromanone.
2. 2-carboxy-6-halogeno-1,4-thiachromanone.
3. A halogeno-2-carboxy-1,4-thiachromanone.
4. 2-carboethoxy-6 - chloro - 1,4 - thiachromanone.

EUCLID WILFRED BOUSQUET.

REFERENCES CITED

The following references are of record in the file of this patent:

FOREIGN PATENTS

| Number | Country | Date |
|---|---|---|
| 845,793 | France | Sept. 1, 1939 |
| 644,319 | France | Oct. 5, 1928 |